United States Patent [19]

Cea et al.

[11] 4,384,004

[45] May 17, 1983

[54] ENCAPSULATED APM AND METHOD OF PREPARATION

[75] Inventors: Theresa Cea, Brooklyn; Joseph D. Posta, Mamaroneck; Michael Glass, Flushing, all of N.Y.

[73] Assignee: Warner-Lambert Company, Morris Plains, N.J.

[21] Appl. No.: 269,081

[22] Filed: Jun. 2, 1981

[51] Int. Cl.³ .................... A23L 1/236; A23G 3/30
[52] U.S. Cl. ................................. 426/3; 426/5; 426/96; 426/99; 426/303; 426/304; 426/307; 426/310; 426/548; 426/658
[58] Field of Search ........................ 426/3–6, 426/658, 548, 285, 302, 303, 307, 31, 310, 96, 99

[56] References Cited

U.S. PATENT DOCUMENTS

| | | | |
|---|---|---|---|
| 4,031,258 | 6/1977 | Haas et al. | 426/548 |
| 4,122,195 | 10/1978 | Bahoshy | 426/548 |
| 4,139,639 | 2/1979 | Bahoshy | 426/3 |
| 4,228,198 | 10/1980 | Burge et al. | 426/548 |
| 4,292,336 | 9/1981 | Latymer | 426/548 |

*Primary Examiner*—Jeanette M. Hunter
*Attorney, Agent, or Firm*—Gary M. Nath

[57] ABSTRACT

The present invention comprises the encapsulation of the artificial sweetener L-aspartyl-L-phenylalanine methyl ester (APM) within a coating material including cellulose ethers, cellulose esters, certain vinyl polymers, gelatin and zein, in a ratio of coating material to APM to 1:1 or less. Shelf stability of products containing the encapsulated APM is nearly doubled. The presently stabilized APM is particularly suited for incorporation into chewing gum formulations.

35 Claims, No Drawings

ENCAPSULATED APM AND METHOD OF PREPARATION

BACKGROUND OF THE INVENTION

1. Field of the Invention

The present invention relates to the preparation of an artificial sweetener, and more particularly to the preparation of APM in an encapsulated form suitable for incorporation in food products, such as chewing gums and candies which exhibits improved shelf stability in such food products.

2. Description of the Prior Art

The sweetening agent known as APM comprises a dipeptide that is chemically identified as L-aspartyl-L-phenylalanine methyl ester, and is described in U.S. Pat. No. 3,492,131, the disclosure of which is incorporated herein by reference. Since its development, APM has been widely recognized as a desirable artificial sweetener having particular utility for incorporation in chewing gum as disclosed by U.S. Pat. No. 3,943,258, to Bahoshy et al.

Several problems have been observed with APM, among them that it breaks down in contact with water, and in contact with certain flavors such as cinnamon. Also, APM tends to break down from exposure to elevated temperatures. In the instance where APM is incorporated in chewing gums, the relatively high temperatures of storage and shipment of the product and contact of the gum with water, tend to cause the APM to break down, and lessens sweetness. In particular, high temperatures have been found to induce the ester linkage to hydrolyze to the dipeptide aspartylphenylalanine which in turn cyclizes to the corresponding diketopiperazine, in which last form sweetness is substantially lessened. Several methods of preparing the APM for incorporation into chewing gums have been proposed that attempt to alleviate this problem by rendering the APM more stable. For example, U.S. Pat. Nos. 4,122,195 and 4,139,639, both to Bahoshy et al., propose to fix APM by preparing it with a material such as gum arabic or the reaction product of a compound containing a polyvalent metallic ion, with an ungelatinized starch acid-ester of a substituted dicarboxylic acid, by a spray drying technique, where the APM and the film former are prepared in an emulsion.

While the foregoing technique is reported to show some improvement in shelf stability, relatively rapid breakdown of APM still occurs. Also, the relatively large amount of APM being stabilized, results in reduced intensity of sweetness release, which is a particularly important attribute of a commercially successful chewing gum.

It is therefore desirable to develop a method for preparing APM in a manner which increases the shelf stability of APM in products to which APM is added.

SUMMARY OF THE INVENTION

In accordance with the present invention, L-aspartyl-L-phenylalanine methyl ester (APM) is provided which comprises particles of the methyl ester encapsulated with at least one layer of a coating material selected from the group consisting of cellulose, cellulose derivatives, starches, carbohydrates, gums, polyolefins, polyesters, waxes, vinyl polymers, gelatin, zein, and mixtures thereof. The coating materials may be either water-soluble or water-insoluble, and may be utilized in amounts with respect to the APM that need not exceed the ratio of 1:1, and may vary to a ratio of about 1:10, and preferably between the ratio of 1:1 to 1:5.

The present invention also relates to a method for extending shelf stability of food products containing L-aspartyl-L-phenylalanine methyl ester (APM) comprising forming particles of APM, and encapsulating the particles in one or more of the coating materials set forth above, so that the ratio of the coating material to the particulate APM does not exceed 1:1. More particularly, the method includes encapsulating the APM particles with the coating materials while the APM particles are in solid form, and at temperatures lying below the decomposition of the APM particles. The temperatures may range up to about 200° F., and preferably range from about 100° to 125° F.

In a preferred embodiment, the method of the present invention is performed by conducting the APM particles in a stream of air that passes through a zone of atomized liquid droplets of the coating material, so that the coating material is deposited on the surfaces of the APM particles. Preferably, the method of the present invention is performed under substantially anhydrous conditions.

The APM may be utilized in a variety of food products where sweetness is desirable, and, in particular, the present invention includes a chewing gum composition comprising a gum base, a flavor, a bulking agent and a sweetener, wherein the sweetener includes L-aspartyl-L-phenylalanine methyl ester particles stabilized by encapsulation within at least one of the coating materials set forth above, the ratio of the coating material to the methyl ester particles ranging up to about 1:1.

The present invention also includes a method for extending the shelf stability of a chewing gum containing the sweetener comprising L-aspartyl-L-phenylalanine methyl ester by encapsulation particles of APM by one or more of the coating materials set forth above, wherein the ratio of the coating material to the methyl ester or APM particles ranges up to about 1:1.

The APM may be encapsulated alone, or may first be combined with a sugar or other sugar substitute, such as sorbitol. The APM may be encapsulated with more than one coating material, and the coating materials may be applied in more than one layer. In one embodiment, plural layers of different coating materials may be sequentially applied.

The APM prepared in accordance with the present invention has been found to exhibit shelf stability when it is incorporated in food products, that substantially exceeds the stability obtained with APM processed in accordance with the prior art. In addition, this stability is gained with a concurrent reduction in the amount of coating material required, so that the sweetness release of APM in a food product may be controlled.

Accordingly, it is a principal object of the present invention to provide the artificial sweetener L-aspartyl-L-phenylalanine methyl ester in a more shelf stable form.

It is a further object of the present invention to provide said methyl ester in stabilized form as aforesaid with a reduction in the coating material required.

It is a yet further object of the present invention to provide said methyl ester in stabilized form as aforesaid by the encapsulation of particles of said methyl ester.

It is a yet further object of the present invention to stabilize said methyl ester by encapsulation of particles thereof at reduced encapsulating temperatures.

It is a still further object of the present invention to provide a method for extending the shelf stability of APM in a chewing gum, by incorporating into said chewing gum said methyl ester in stabilized form as aforesaid.

Other objects and advantages will become apparent to those skilled in the art from a review of the ensuing description.

DETAILED DESCRIPTION

L-aspartyl-L-phenylalanine methyl ester (APM), though a recently developed material, is known, and its preparation is set forth in U.S. Pat. No. 3,492,121, incorporated earlier herein by reference.

As noted earlier, APM displays sensitivity when it is exposed to elevated temperature, moisture, and certain other food ingredients, including flavorings. Such exposure causes APM to break down to the corresponding diketopiperazine (DKP), which is evidenced by a proportionate decrease in sweetness.

The APM prepared in accordance with the present invention comprises particles of APM encapsulated with a coating material that is inert with respect to the APM, and is nontoxic and therefore acceptable for consumption. The coating materials or encapsulants utilized in the present invention includes cellulose, cellulose derivatives, starches, carbohydrates, gums, polyolefins, polyesters, waxes, vinyl polymers, gelatin, zein, and mixtures thereof. The foregoing materials include both water-soluble and water-insoluble coatings, that may all be used successfully.

More particularly, the coating materials useful in the present invention include cellulose, cellulose derivatives such as cellulose ethers and cellulose esters, including methyl cellulose, ethyl cellulose, cellulose nitrate, cellulose acetate phthalate, carboxymethylcellulose, and hydroxyethyl cellulose. Carbohydrates may include arabinogalactan, and others; polyolefins include polyethylene and vinyl polymers include polymethacrylates, polyamides, ethylene-vinylacetate copolymers, and polyvinylpyrrolidone.

Suitable gums may include gum arabic, while waxes may include paraffin, carnauba wax, spermaceti, and beeswax. Certain lipids may also be acceptable, such as stearic acid, stearyl alcohol, and glyceryl stearate.

In a further embodiment, the coating materials of the present invention may be selected from the group consisting of ethyl cellulose, hydroxypropyl cellulose, gelatin, polyvinylpyrrolidone, zein and mixtures thereof. The invention is not limited to these materials, however, and contemplates the inclusion of all of the materials set forth above.

Though the ratio of the quantity of the coating materials or encapsulating agents to the APM may vary, it is possible to successfully coat and stabilize the APM with no more than an equal quantity of each. Ratios of coating material to APM may range from 1:1 to 1:10 and in a particular embodiment, may range from 1:1 to 1:5.

APM particles may be encapsulated by more than one layer of the coating materials, in accordance with the coating process described hereinafter. In a further embodiment, the APM particles may be coated by plural diverse coating materials, disposed either in mixture with each other or in discrete layers. In the latter instance, for example, the APM may be initially coated with a water-soluble resin, after which a water-insoluble resin may be disposed thereover. The advantage of this latter sequence, is to extend the protection of the APM from premature exposure to water, and resultant breakdown.

The present method of preparing APM comprises encapsulating the APM with the coating materials and within the parameters set forth above. APM may be encapsulated by a variety of coating techniques, including spray drying, coascervation, and the like. Preferably, the APM is encapsulated by a method that operates in similar fashion to fluidized bed coating processes, in that particles of APM are suspended in an apparatus that creates a strong upward air current or stream in which the particles move. The stream passes through a zone of finely atomized droplets of the coating material or encapsulant, after which the thus coated particles pass out of the upward stream and pass downward in a fluidized condition countercurrent to a flow of heated fluidized gas whereupon they are dried, and may reenter the upward-moving coating zone for a subsequent discrete coating application. The foregoing method and associated apparatus are known as the Wurster Process. The Wurster Process and its associated apparatus are set forth in detail in the following U.S. Patents, disclosures of which are incorporated herein by reference: U.S. Pat. No. 3,089,824; U.S. Pat. No. 3,117,027; U.S. Pat. No. 3,196,827; U.S. Pat. No. 3,241,520; and U.S. Pat. No. 3,253,944.

One of the advantages of the present method is that it may be conducted at temperatures that are reduced from those utilized in prior art encapsulation processes. In particular, the present process may operate at inlet temperatures in the order of 100° to 125° F., so that relatively mild heating of the APM takes place while the coating material is disposed thereon. The temperature may vary up to the decomposition point of APM, and for example, may range as high as 200° F. The selection of a particular temperature within the aforementioned range is therefore contemplated within the scope of the present invention.

The coating material is prepared for use in the present encapsulation method by the formation of a liquid capable of being uniformly atomized. In particular, solutions, dispersion or emulsion of the coating materials in respective solvents may be prepared, depending upon the nature of the coating material. For example, water-soluble coating materials may be prepared as aqueous solutions, while those water-insoluble resins or coating materials are prepared with appropriate organic solvents such as acetone, lower alcohols such as isopropyl alcohol, and the like.

In a preferred embodiment, encapsulated APM may be prepared under substantially anhydrous conditions, as the water present in the prior art particle forming processes promotes the undesired hydrolytic breakdown. By "substantially anhydrous" in accordance with the present invention, it is meant that the APM is encapsulated while in solid form, as distinguished from the disposition of APM in an emulsion that takes place when APM is combined with a coating material by the spray drying technique.

In addition, the encapsulant itself may be chosen from those water-insoluble coating materials, whereby the corresponding coating solution is non-aqueous. The invention also includes, however, the preparation and use of water-soluble coating materials disposed in aqueous solutions.

In some instances, it may be desirable to add other ingredients such as plasticizers, to improve the properties of the ultimate coating. Suitable plasticizers include the glyceryl ester of sebacic acid, diethyl phthalate, glyceryl triacetate, tributyl citrate, acetylated monoglyceride, citric acid ester of monodiglyceride, adipate ester, and others. The plasticizers may be added in known effective amounts within the scope of the invention. Such other known materials acceptable for ingestion, may also be utilized herein.

The coating materials are projected through an appropriately sized nozzle to form an atomized cloud of coating material particles. The coating materials may be projected at a rate of flow ranging from about 100 up to about 500 ml/minute and the particles of APM may receive their first coating within 3 to 10 seconds. The entire process may naturally vary depending upon the extent of coating desired, and can range from 10 minutes to 2 hours. Naturally, the foregoing parameters are for purposes of illustration only, and may vary depending upon the nature of the coating material, the nozzle utilized in the coating apparatus and the desired extent of encapsulation.

As noted earlier, the ratio of encapsulating agent or coating material to APM may vary from about 1:1 to about 1:10 or better.

Even encapsulated APM particles having the minimum coating in accordance with the present invention exhibit the improved shelf stability over encapsulated APM prepared in accordance with the prior art.

The encapsulated APM particles may be prepared in a variety of sizes, and it may be desirable to reduce the size of the particles for use in chewing gum formulations. The particles may accordingly be reduced in size to, for example, from about 60 to about 20 mesh size by conventional means, such as grinding, without deleteriously affecting the stability of the resulting APM particles.

The APM may be prepared in encapsulated form alone, or may be combined with other sugars or sugar substitutes as later defined, such as sorbitol, by the formation of a mixture of the two materials. Sorbitol is a known sugar substitute which may be utilized in conjunction with other such agents either alone or in a mixture with APM. In the instance where a co-melt of sorbitol and APM is formed, the melt is solidified and the resulting composite particle may, if necessary, be reduced in size and encapsulated in accordance with the method set forth above. APM, as noted earlier, may replace sugar or sucrose in a variety of foods, such as breakfast cereals, dairy product analog toppings, candy, and chewing gums.

In the instance where APM is to be incorporated in a chewing gum, the gum base may be any chewable, substantially water-insoluble base such as chicle or substitutes thereof, guttagkay, sorva, jelutong, synthetic resins, rubbers and the like and mixtures of these materials. The amount of gum base employed in the chewing gum may vary depending upon the particular base utilized and the other ingredients that make up the final product. Generally, however, the gum base may vary in amount from about 15 to 40% by weight of the final composition, and preferably from about 20 to about 30% by weight.

Plasticizers or softeners such as lanolin, propylene glycol, glycerol and the like and mixtures of these may optionally be incorporated within the gum base to achieve desired texture and consistency. The flavors employed in chewing gums may be the essential oils or synthetic flavors or mixtures of these. Flavors such as cinnamon, wintergreen, spearmint; peppermint, birch, anise, fruit flavors and the like may be utilized satisfactorily. The amount of flavoring is a matter of preference, but may be subject to such factors as the type of flavor and the type of base utilized in conjunction therewith. Generally, flavoring materials account for about 1% by weight of the total gum composition.

As it is generally desirable that the chewing gum possess a distinct and flavorable sweetness, the remaining portion of the chewing gum is generally composed of a sweetener such as sugar or, in the instance of sugarless gums, a sugar substitute. By sugar, is meant sucrose, dextrose, corn syrup, solids and substitutes thereof, and mixtures thereof. Sugar substitutes may include any sweetening agents utilized in sugarless gum such as mannitol, sorbitol, xylitol, saccharin, cyclamate, and dipeptides such as APM, dihydrochalcone, glycyrrhizin, and *Stevia rebaudiana* (Stevioside). Also contemplated as an additional sweetener is the non-fermentable sugar substitute (hydrogenated starch hydrolysate) which is described in U.S. Reissue Patent 26,959, and the synthetic sweetener 3,4-dihydro-6-methyl-1, 2,3-oxathiazin-4-one-2,2-dioxide particularly the potassium, sodium and calcium salts thereof as described in German Pat. No. 2,001,017.7.

Sugar and sugar alcohols may also be included and defined as bulking agents, and generally comprise a major amount by weight of the total composition. Additionally, non-sweet bulking agents such as hydrolyzed cereal solids may be included as well.

In the instance where the encapsulated APM of the present invention is to be incorporated in a chewing gum, it may be utilized in an amount ranging from about 0.02 to about 0.25%, and will offer satisfactory sweetness. Naturally, the exact amount of encapsulated APM incorporated in a given chewing gum may vary depending, as indicated earlier, upon the remaining ingredients thereof, and the invention is not limited to a specific range of proportions.

The present invention will be better understood from a consideration of the following illustrative examples, wherein all percentages expressed are intended to be percent by weight unless otherwise specified.

EXAMPLE I

Comparative testing of chewing gums incorporating encapsulating APM were conducted. Two formulations containing, respectively, APM encapsulated in Gum Arabic and APM encapsulated in Capsul® Dextrin were prepared in accordance with the procedure outlined in U.S. Pat. No. 4,139,639, in Example II. The relevant disclosure of the '639 patent is incorporated herein by reference.

Comparative chewing gum formulations were prepared in the same manner as disclosed in the patent, with the exception that the APM utilized in each formulation was prepared in accordance with the present invention. Particularly, APM particles were encapsulated with the following coating materials, by the Wurster Process, to form particles having a size ranging from about 20 to about 60 mesh; the coating materials comprised ethyl cellulose, hydroxypropyl cellulose and polyvinyl pyrrolidone. Encapsulated APM particles were incorporated into chewing gum formulations, and shelf stability calculated in terms of percentage loss of APM was observed and noted over a time period ranging up to 18 weeks. The tests involving the formulations of the '639 patent varied by the use of the flavor peppermint, while those of the present invention utilized the flavor spearmint.

The results of these tests are set forth in Table I, below.

The results of these tests are set forth in Table II, below. The differing characteristics of each preparation are set forth in the Table.

TABLE II

| | | APM LOSS DURING STORAGE | | | | | | | | |
|---|---|---|---|---|---|---|---|---|---|---|
| SAMPLE NO. | DESCRIPTION | | APM LEVEL (ppm) | | | | | | | |
| | | THEORETICAL | INITIAL | 2 wks | 4 wks | 8 wks | 12 wks | 18 wks | 20 wks | 38 wks |
| 1 | Sugarless Spearmint Gum - no film on APM | RT 37° C. | 500 | — | 180 110 | 210 130 | 150 110 | | | 180 180 | |
| 2 | Spearmint Gum - APM in hydroxypropyl cellulose, 40 mesh | RT 37° C. | 500 | — | 570 430 | 400 480 | 510 435 | | | 575 145 | |
| 3 | Spearmint Gum - APM in ethyl cellulose, 40 mesh | RT 37° C. | 1000 | 810 | | 810 605 | 1000 730 | 1185 720 | 935 785 | | 505 |
| 4 | Spearmint Gum - APM in hydroxypropyl cellulose, 40 mesh | RT 37° C. | 1000 | 1040 | | 820 880 | 870 1000 | 795 630 | 770 710 | | 390 |
| 5 | Spearmint Gum - APM in polyvinyl pyrrolidone, 40 mesh | RT 37° C. | 1000 | 1015 | | 990 820 | 1180 750 | 825 880 | 450+ 790 | | 1008 |
| 6 | Spearmint Gum - APM in ethyl cellulose - hydroxypropyl cellulose mixture (60/40), 40 mesh | RT 37° C. | 1000 | 1030 | | 710 475 | 730 — | 425 780 | 450 410 | | 240 |
| 7 | Spearmint Gum - APM in gelatin, 40 mesh | RT 37° C. | 1000 | 780 | | 955 1050 | 880 900 | 1060 815 | 830 520 | | 615 |
| 8 | Cinnamon Gum - APM in hydroxypropyl cellulose, 40 mesh | RT 37° C. | 1000 | 900 | | | 860 555 | 865 360 | | | 630 |
| 9 | Cinnamon Gum - APM in ethyl cellulose - hydroxypropyl cellulose mixture (60/40), 40 mesh | RT 37° C. | 1000 | 700 | | | 975 515 | 595 385 | | | 590 |
| 10 | Cinnamon Gum - APM in gelatin, 40 mesh | RT 37° C. | 1000 | 805 | | | 825 585 | 600 650 | | | 540 |
| 11 | Cinnamon Gum - APM in ethyl cellulose, 40 mesh | RT 37° C. | 1000 | 1100 | 985 575 | 920 720 | 715 615 | | | 590 | 785 |
| 12 | Cinnamon Gum - APM in polyvinyl pyrrolidone, 40 mesh | RT 37° C. | 1000 | 755 | | | 630 395 | 825 | 450 | | 750 | below.

TABLE I

| | | EFFECT OF ENCAPSULATION ON APM STABILITY | | | | | |
|---|---|---|---|---|---|---|---|
| | | % APM LOSS AT 100° F. | | | % APM LOSS AT 37° C. (approx. 98.6° F.) | | |
| SAMPLE # | DESCRIPTION | 4 wks | 9 wks | 20 wks | 4 wks | 9 wks | 20 wks |
| *1 | APM Fixed in Gum Arabic | 17 | 22 | 43 | | | |
| *2 | APM Fixed in Capsul ® | 21 | 32 | 54 | | | |
| 3 | APM Encapsulated with Ethyl Cellulose | | | | 40 | 28 | 22 |
| 4 | APM Encapsulated with Hydroxypropyl Cellulose | | | | 12 | 37 | 29 |
| 5 | APM Encapsulated with Polyvinyl Pyrrolidone | | | | 18 | 12 | 21 |

*Corresponds to Samples 5 and 6 of U.S. Pat. No. 4,139,639.

From the above, it is apparent that the chewing gum formulations utilizing the encapsulated APM of the present invention lost approximately 50% less APM over a comparable period than did the formulations employing the APM stabilized in accordance with the prior art.

EXAMPLE II

A series of chewing gum formulations were prepared in the same manner as those prepared in Example I. A series of APM encapsulations were made, and the encapsulated particles were then combined with the remaining chewing gum ingredients in identical quantities with respect to each other. The samples were divided up so that samples of each preparation were subjected to observation at room temperature and at 37° C. Observation was conducted over a period of 38 weeks, and This invention may be embodied in other forms or carried out in other ways without departing from the spirit or essential characteristics thereof. The present invention is therefore to be considered as in all respects illustrative and not restrictive, the scope of the invention being indicated by the appended claims, and all changes which come within the meaning and range of equivalency are intended to be embraced therein.

What is claimed is:

1. L-aspartyl-L-phenylalanine methyl ester comprising solid particles of said methyl ester encapsulated by a coating material selected from the group consisting of cellulose, cellulose derivatives, arabinogalactin, gum arabic, polyolefins, waxes, vinyl polymers, gelatin, zein and mixtures thereof, wherein the amount of said coating material to said methyl ester is from 1:1 to 1:10.

2. The methyl ester of claim 1 wherein said coating material is selected from the group consisting of cellulose, methyl cellulose, ethyl cellulose, cellulose nitrate, cellulose acetate phthalate, carboxymethyl cellulose, hydroxyethyl cellulose, hydroxypropyl cellulose, arabinogalactan; polyethylene, polymethacrylates, polyamides, ethylene-vinyl acetate copolymers, polyvinylpyrrolidone; gum arabic; paraffin wax, carnauba wax, spermaceti, beeswax; stearic acid, stearyl alcohol, glyceryl stearate; gelatin, zein and mixtures thereof.

3. The methyl ester of claim 1, wherein said particles are encapsulated by the deposition of atomized droplets of at least one layer of said coating material thereon.

4. The methyl ester of claim 1 wherein plural layers of said coating material are deposited upon said particles.

5. The methyl ester of claim 1 wherein plural coating materials are utilized.

6. The methyl ester of claim 5 wherein said plural coating materials are mixed with each other prior to deposition upon said particles.

7. The methyl ester of claim 1 wherein said ratio ranges up to 1:5.

8. The methyl ester of claim 1 wherein said methyl ester is combined with at least one optional sweetener selected from sugar, sugar substitutes, and mixtures thereof, prior to encapsulation by said coating material.

9. The methyl ester of claim 8 wherein said optional sweetener comprises sorbitol.

10. A chewing gum composition comprising a gum base, a flavor, a bulking agent and the sweetener, of claim 1.

11. The composition of claim 10 wherein said coating material is selected from the group consisting of cellulose, methyl cellulose, ethyl cellulose, cellulose nitrate, cellulose acetate phthalate, carboxymethyl cellulose, hydroxyethyl cellulose, hydroxypropyl cellulose, arabinogalactan; polyethylene, polymethacrylates, polyamides, ethylene-vinyl acetate copolymers, polyvinylpyrrolidone; gum arabic; paraffin wax, carnauba wax, spermaceti, beeswax; stearic acid, stearyl alcohol, glyceryl stearate; gelatin, zein and mixtures thereof.

12. The composition of claim 10, wherein said particles are encapsulated by the deposition of atomized droplets of at least one layer of said coating material thereon.

13. The composition of claim 10 wherein plural layers of said coating material are deposited upon said particles.

14. The composition of claim 10 wherein plural coating materials are utilized.

15. The composition of claim 14 wherein said plural coating materials are mixed with other prior to deposition upon said particles.

16. The composition of claim 10 wherein said ratio ranges from about 1:1 to about 1:5.

17. The composition of claim 10 wherein said methyl ester is combined with at least one optional sweetener selected from sugars, sugar substitutes, and mixtures thereof prior to encapsulation.

18. The composition of claim 17 wherein said optional sweetener comprises sorbitol.

19. A method for preparing L-aspartyl-L-phenylalanine methyl ester having improved shelf stability when incorporated in food products, comprising forming solid particles of said methyl ester, and
encapsulating said solid particles in a coating material selected from the group consisting of cellulose, cellulose derivatives, arabinogalactin, gum arabic, polyolefins, waxes, vinyl polymers, gelatin, zein and mixtures thereof, wherein the amount of said coating material to said methyl ester is from 1:1 to 1:10 wherein said methyl ester is encapsulated by the deposition of the coating material at a temperature of up to about 200° F.

20. The method of claim 19 wherein said coating material is selected from the group consisting of cellulose, methyl cellulose, ethyl cellulose, cellulose nitrate, cellulose acetate phthalate, carboxymethyl cellulose, hydroxyethyl cellulose, hydroxypropyl cellulose, arabinogalactan; polyethylene, polymethacrylates, pyrrolidone; gum arabic; paraffin wax, carnauba wax, spermaceti, beeswax; stearic acid, stearyl alcohol, glyceryl stearate; gelatin, zein and mixtures thereof.

21. The method of claim 19, wherein said particles are encapsulated by the deposition of atomized droplets of at least one layer of said coating material thereon.

22. The method of claim 19 wherein said deposition is conducted at a temperature ranging from about 100° F. to about 125° F.

23. The method of claim 19 wherein plural layers of said coating material are deposited upon said particles.

24. The method of claim 19 wherein plural coating materials are utilized.

25. The method of claim 24 wherein said plural coating materials are mixed with each other prior to deposition upon said particles.

26. The method of claim 24 wherein said plural coating materials are deposited separately and sequentially upon said particles.

27. The method of claim 19 wherein said ratio ranges up to 1:5.

28. The method of claim 19 wherein said methyl ester is combined with at least one optional sweetener selected from sugar, sugar substitutes, and mixtures thereof, prior to encapsulation by said coating material.

29. The method of claim 28 wherein said optional sweetener comprises sorbitol.

30. The stabilized methyl ester of claim 19 wherein said particles are encapsulated under substantially anhydrous conditions.

31. The method of claim 21 wherein said deposition is performed by conducting said particles in a stream of air passing through a zone of said atomized droplets.

32. A method for extending the shelf stability of a chewing gum composition to which the sweetener L-aspartyl-L-phenylalanine methyl ester is to be added, comprising forming solid particles of said methyl ester, and
encapsulating said solid particles in a coating material selected from the group consisting of cellulose, cellulose derivatives, arabinogalactin, gum arabic, polyolefins, waxes, vinyl polymers, gelatin, zein and mixtures thereof, wherein the amount of said coating material to said methyl ester is from 1:1 to 1:10, and
recovering the encapsulated particles, and incorporating said encapsulated particles into said chewing gum composition.

33. The method of claim 32 wherein said coating material is selected from the group consisting of cellulose, methyl cellulose, ethyl cellulose, cellulose nitrate, cellulose acetate phthalate, carboxymethyl cellulose, hydroxyethyl cellulose; arabinogalactan; polyethylene, polymethacrylates, polyamides, ethylene-vinyl acetate copolymers, polyvinylpyrrolidone; gum arabic; paraffin wax, carnauba wax, spermaceti, beeswax; stearic acid, stearyl alcohol, glyceryl stearate; gelatin, zein and mixtures thereof.

34. The method of claim 32 wherein said methyl ester is combined with at least one optional sweetener selected from sugar, sugar substitutes, and mixtures thereof, prior to encapsulation by said coating material.

35. The method of claim 34 wherein said optional sweetener comprises sorbitol.

* * * * *